H. K. FLINCHBAUGH.
Carriage-Wheel.
No. 39,561.　　　　　　　　　　　　　　Patented Aug. 18, 1863.
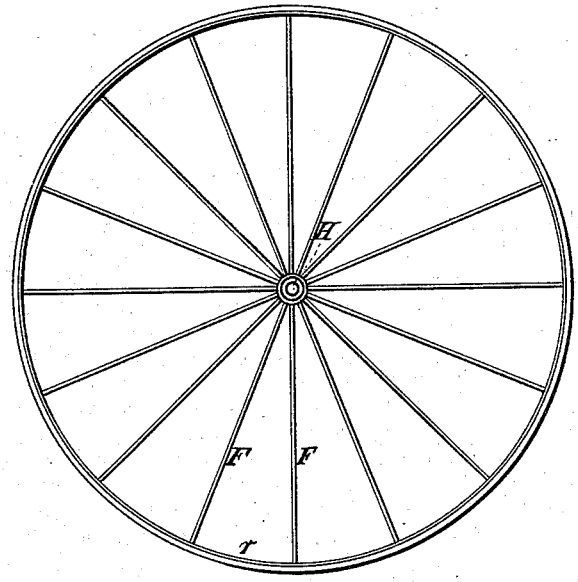
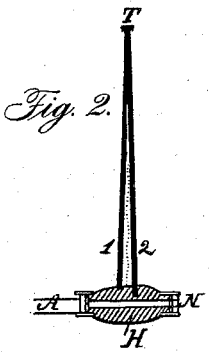
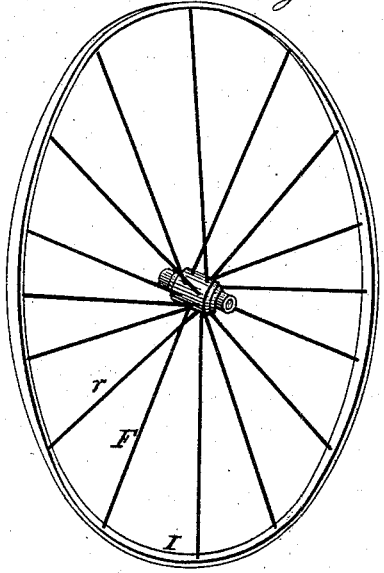
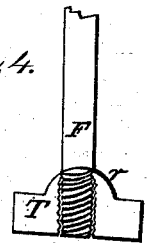
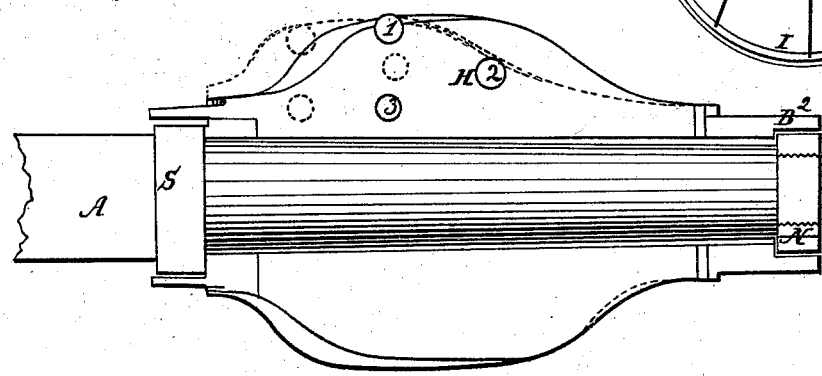
Witnesses:　　　　　　　　　　　　　　Inventor:

United States Patent Office.

HENRY K. FLINCHBAUGH, OF CONESTOGA CENTRE, PENNSYLVANIA.

IMPROVEMENT IN CARRIAGE-WHEELS.

Specification forming part of Letters Patent No. 39,561, dated August 18, 1863.

*To all whom it may concern:*

Be it known that I, HENRY K. FLINCHBAUGH, of Conestoga Center, in the county of Lancaster and State of Pennsylvania, have invented a new and Improved Mode for Constructing Metallic Wheels for Carriages; and I do hereby declare that the following is a full and exact description thereof, reference being had to the accompanying drawings, and to the letters of reference marked thereon, in which—

Figure 1 is a front view of the wheel. Fig. 2 shows the inclination of the spokes 1 2, being inserted centrally on two lines drawn around the hub H — say an inch or more apart—so as to alternate or come zigzag at their base, each at its respective point to enter the tire, around its inner central line, standing thus alternately on the right and left of the perpendicular line drawn from the center of the tire T to that on the hub or nave of the wheel H, at their base, as shown. Fig. 3 is an attempt to show the wheel in perspective. Fig. 4 is a full-sized vertical section of the tire T, with its continuous central raised and rounded rib, r, showing the screw-end of one of the spokes in place, being also made of round wrought-iron, the tire T being rolled to the shape shown, out of wrought-iron. Fig. 5 is a full-sized section of the cast-iron hub H.

A is the axle, with its shoulder s, terminal screw and burr N, as in common use, in place.

The circles 1 2 3 show the insertion of the spokes and their relative position around the hub.

The dotted lines are intended to show an increase of metal behind, allowing the spokes to be set farther back and nearer to the bearing of the axle, at its shoulder, giving more strength where it is required and less metal in front, making it, however, less symmetrical. I, however, do not confine myself to the size or shape of the same.

The object in view is to make a strong, neat carriage-wheel all of metal, so as to dispense with wood altogether; the inner raised ridge, r, on the tire, in place of fellies, thus combining beauty with strength, and constituting a durable and desirable light wheel, that will resist the action both of fire and water under ordinary circumstances.

My mode of constructing the wheel is as follows: The tire, rolled to shape, of wrought-iron, as aforesaid, to its proper length, is bent and welded, (with its raised edge r on the inside,) forming the rim of the wheel. This is set up perpendicularly in a frame, and holes are drilled in at the proper points for the spokes. By the use of a long drill-stock, resting above against the outside of the wheel or rim, the hole will receive its proper inclination by alternately changing sides. The alternate inclination will be given for each respective spoke of the entire series—say sixteen. A screw-thread is then cut into each hole, being all on the center of the raised ridge r. The spokes, of round wrought-iron, cut to length and provided with a screw cut on one end, are now firmly screwed into the tire. The wheel is then ready to receive the hub, for which purpose it is laid down. A flask especially adapted thereto is applied centrally, in which the properly-made pattern is molded in the usual manner, with its core for the axle and proper disposition of the ends of the spokes, around which the metal is poured, (of course after withdrawing the pattern,) and the wheel is finished, ready for cleaning and painting to your fancy.

I am aware that hubs have been cast on the inner ends of wrought-iron spokes after they have been loosely fitted to the wrought-iron rim. I am also aware that hubs made in two parts, one fitting within the other, for inserting and firmly holding metallic spokes have been used, as also metallic spokes with a screw end inserted into the hub, and otherwise in combination with fellies, neither of which I claim.

I do not claim the combination of a solid hub with the spokes otherwise attached to the rim or tire than herein set forth.

What I claim as my invention, and desire to secure by Letters Patent, is—

The wrought-iron spokes, when inserted directly into the ridge r on the tire by means of a screw cut on the outer end, bringing their other ends alternately to the right and left of a central line around the hub, in which they are firmly embedded by having the hub molded and cast around them, substantially in the manner specified.

HENRY K. FLINCHBAUGH.

Witnesses:
 CHAS. R. FRAILEY,
 JACOB STAUFFER.